Jan. 15, 1929.
W. H. CHANDLEE
ILLUSION DEVICE
Original Filed Sept. 28, 1925
1,699,345
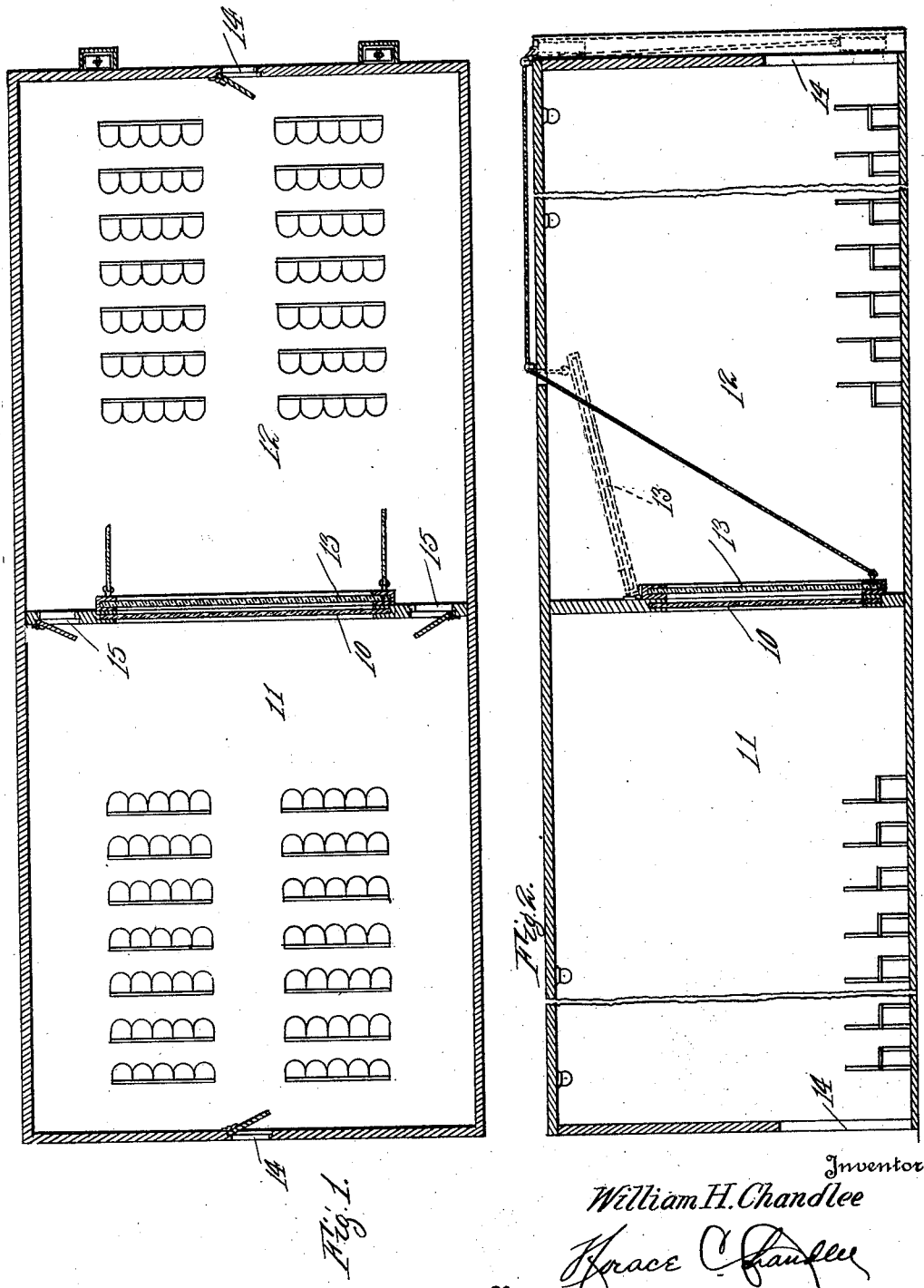
Inventor
William H. Chandlee
By Horace C. Chandlee
Attorney Patented Jan. 15, 1929.

1,699,345

UNITED STATES PATENT OFFICE.

WILLIAM H. CHANDLEE, OF WASHINGTON, DISTRICT OF COLUMBIA.

ILLUSION DEVICE.

Application filed September 28, 1925, Serial No. 59,171. Renewed June 12, 1928.

This invention relates to new and useful improvements in theatrical appliances, and particularly to devices for producing illusions.

One object of the invention is to provide a device of this character by means of which an audience may be made to disappear, from their own sight, and such audience see nothing but empty seats.

Another object is to provide a device of this character by means of which an audience may see themselves, and all of the objects in the room, reflected from a mirrored surface, and by manipulation of a system of lights, such audience may be made to disappear, and in their stead see different persons, skeletons, or the like, in the seats they apparently occupy.

Another object is to provide duplicate rooms, between which is placed a transverse sheet of transparent glass, through which the audience may see a similar room, but without any occupants of the chairs, and by proper manipulation of lights, such audience be made to appear in their seats, by means of reflection on said glass. Various other illusions may be produced by first permitting the audience to see their reflections in the glass, and then to so manipulate the lights as to render the glass transparent, and permit the audience to see the other duplicate room, through the glass, but minus certain objects which are normally reflected in the glass.

Other objects and advantages will be apparent from the following description when taken in connection with the accompanying drawing.

In the drawing:

Figure 1 is a plan view of the duplicate rooms, and the transparent glass, and mirror therebetween.

Figure 2 is a vertical longitudinal central sectional view on the line 2—2 of Figure 1.

Referring particularly to the accompanying drawing, there is shown a long room, which is divided by a vertical transverse sheet of transparent glass 10, into two identically furnished and arranged rooms 11 and 12, in the former of which the audience is seated, while the latter is used to contain confederates, used in the illusions. It is to be noted, however, that the objects in the room 12 are arranged in such a manner as to produce the illusion of a perfect reflection of the room 11. Disposed directly behind the glass 10 is a large mirror 13, of the exact size of the glass 10, such mirror being adapted to be elevated from behind the glass, when it is desired to permit the audience to see the rear room 12. When, however, the mirror is in lowered position, the audience sees the reflection of the room 11, and all of the objects therein, in the mirror.

In the normal setting, the mirror is in lowered position so that the room 11 is reflected, and the persons see themselves. By darkening the room 11, and lighting the room 12, after having lifted the mirror, the audience sees the room 12, through the glass 10, with its empty seats, as though they were seeing the room 11 reflected in the mirror, and such persons had disappeared from the seats. Also, skeletons, or different persons may be seated in the room 12, so that the persons in room 11 see, through the glass 10, what appears to be the room 11, but with such persons changed into skeletons, or different persons.

While the mirror is elevated, a confederate walks down the center aisle, of the room 12, toward the glass 10, and the audience, thinking that such person is in the aisle of room 11, will turn to see such person, but find the aisle empty. Then, a confederate will walk down the aisle in room 11, while at the same time a second confederate will walk down the aisle of room 12, but when the second confederate reaches a certain point in the aisle, the lights are so manipulated that the second confederate disappears, and the first confederate continues to walk down the aisle of the room 11. The audience will think that the second confederate is the reflection of the first confederate, but will be confused when they see that there is a person in the aisle of room 11, together with all of the other objects and persons, but do not see any reflection of the confederate in the glass. The audience, as well as the other objects in the room will be seen, but without the confederate.

The lights can be so manipulated as to cause persons to slowly disappear from the view of the audience, and again be made to gradually take shape. It will be understood that while the mirror is elevated or lowered, the lights are completely extinguished for a very short time, so that the movement of the mirror cannot be detected by the audience. This can be done so quickly that the audience will not be able to detect the change from glass to mirror, or from mirror to glass.

If desired, the mirror may be dispensed with, and only the transparent glass 10 used. When the room 12 is dark, and the room 11 is light, the audience sees the reflection of the room 11 on the glass. When, however, the room 12 is lighted and the room 11 darkened, the audience sees the room 12, through the clear glass 10, thus producing the illusion of the apparent reflection of the room 11, with the seats unoccupied, or occupied by other objects, as skeletons, or the like, to give fantastic or weird effects to the illusions.

The rooms 11 and 12 may be provided with identically arranged doors and windows 14 and 15, so that a confederate passing through a door in room 12, will appear to be passing through a door in room 11, but upon the audience turning toward the corresponding door, will see no one. Similarly, when a confederate passes through a door in room 11, he is seen reflected on the glass or mirror, but when the mirror is elevated, and the lights properly manipulated, the reflection of the confederate disappears, from the view of the audience.

What is claimed is:

1. An apparatus for producing optical illusions comprising longitudinally alined and identically but reversely furnished rooms, a sheet of clear transparent glass disposed between the rooms at right angles to the longitudinal axes thereof, and a system of lights in the rooms for alternately illuminating the rooms to utilize the reflective properties of the glass, at times, and to utilize the transparent properties of the glass at times.

2. An apparatus for producing optical illusions comprising longitudinally alined and identically but reversely furnished rooms, a sheet of clear transparent glass disposed between the rooms at right angles to the longitudinal axes thereof, and a system of lights in the rooms for alternately illuminating the rooms to utilize the reflective properties of the glass, at times, and to utilize the transparent properties of the glass, at times, whereby an audience viewing the glass from one of the rooms will see that room reflected from the glass, at times, and at times see the other room through the glass.

In testimony whereof, I affix my signature.

WILLIAM H. CHANDLEE.